(12) United States Patent
Ha et al.

(10) Patent No.: US 10,586,397 B1
(45) Date of Patent: Mar. 10, 2020

(54) AUGMENTED REALITY SERVICE SOFTWARE AS A SERVICE BASED AUGMENTED REALITY OPERATING SYSTEM

(71) Applicant: VIRNECT inc., Naju-si (KR)

(72) Inventors: Tae Jin Ha, Naju-si (KR); Jea In Kim, Naju-si (KR); Noh Young Park, Naju-si (KR); Back Sun Kim, Naju-si (KR); Chang Suu Ha, Naju-si (KR); Kyung Won Kil, Naju-si (KR)

(73) Assignee: VIRNECT INC., Naju-si (KR)

( * ) Notice: Subject to any disclaimer, the term of this patent is extended or adjusted under 35 U.S.C. 154(b) by 0 days.

(21) Appl. No.: 16/531,742

(22) Filed: Aug. 5, 2019

(30) Foreign Application Priority Data

Aug. 24, 2018 (KR) .................. 10-2018-0099262

(51) Int. Cl.
*G06T 19/00* (2011.01)
*G06K 9/00* (2006.01)
(Continued)

(52) U.S. Cl.
CPC ........ *G06T 19/006* (2013.01); *G06K 9/00671* (2013.01); *G06K 9/6215* (2013.01);
(Continued)

(58) Field of Classification Search
CPC .............. G06T 19/006; G06K 9/00671; G06K 9/6215; G06K 9/6217; G06Q 30/04; H04L 67/02; H04L 67/10
See application file for complete search history.

(56) References Cited

U.S. PATENT DOCUMENTS

| | | | |
|---|---|---|---|
| 2012/0194541 A1* | 8/2012 | Kim | G06F 16/29 345/619 |
| 2014/0289607 A1* | 9/2014 | Ko | G06F 16/954 715/234 |

(Continued)

FOREIGN PATENT DOCUMENTS

| KR | 101380854 B1 | 4/2014 |
|---|---|---|
| KR | 1020160092292 A | 8/2016 |
| KR | 101793886 B1 | 11/2017 |

OTHER PUBLICATIONS

Bethea Davida, "Bag of Visual Words in a Nutshell", https://towardsdatascience.com/bag-of-visual-words-in-a-nutshell-9ceea97ce0fb, Jul. 3, 2018 (Year: 2018).*

*Primary Examiner* — Michelle L Sams
(74) *Attorney, Agent, or Firm* — STIP Law Group, LLC

(57) ABSTRACT

An augmented reality operating system based on augmented reality software as a service (SaaS) comprises an augmented reality management system providing a pre-assigned 3D virtual image to a web browser which has transmitted a URL address in a distribution mode and in supporting creation of augmented reality content based on augmented reality software as a service in an authoring mode, providing a template for creating the augmented reality content on a web browser authorized as a manager and billing a payment according to the type of template used; a user terminal receiving the 3D virtual image from the augmented reality content management system by transmitting the URL address through an installed web browser and displaying each physical object of actual image information displayed on the web browser by augmenting the physical object with a pre-assigned virtual object of the 3D virtual image in a distribution mode; and a manager terminal accessing augmented reality software as a service of the augmented reality content management system via an installed web browser, creating the augmented (Continued)

reality content by determining an augmentation position on a map, a physical object of actual image information located at the augmentation position, and a virtual object assigned to the physical object respectively in an authoring mode.

4 Claims, 13 Drawing Sheets

(51) Int. Cl.
*G06K 9/62* (2006.01)
*G06Q 30/04* (2012.01)
*H04L 29/08* (2006.01)

(52) U.S. Cl.
CPC ........... *G06K 9/6217* (2013.01); *G06Q 30/04* (2013.01); *H04L 67/02* (2013.01); *H04L 67/10* (2013.01)

(56) References Cited

U.S. PATENT DOCUMENTS

2015/0091942 A1* 4/2015 Ko .................. G06T 19/006
                                                                    345/633
2018/0047213 A1* 2/2018 Woo ................ G06T 19/006

* cited by examiner

AUGMENTED REALITY SERVICE SOFTWARE AS A SERVICE BASED AUGMENTED REALITY OPERATING SYSTEM

CROSS REFERENCE TO RELATED APPLICATION(S)

This application claims the priority to Korean Patent Application No. 10-2018-0099262, filed on Aug. 24, 2018, which is all hereby incorporated by reference in its entirety.

BACKGROUND

Technical Field

The present invention relates to an augmented reality operating system and, more particularly, to an augmented reality software as a service based augmented reality operating system.

Related Art

Recently, researches are actively conducted on provision of interactive contents based on the augmented reality technique that shows the physical world overlaid with various pieces of information when a camera module captures a scene of the physical world.

Augmented Reality (AR) belongs to the field of Virtual Reality (VR) technology and is a computer technique that makes a virtual environment interwoven with the real-world environment perceived by the user, by which the user feels as if the virtual world actually exists in the original physical environment.

Different from the conventional virtual reality that deals with only the virtual space and objects, AR superimposes virtual objects on the physical world base, thereby providing information augmented with additional information, which is hard to be obtained only from the physical world.

In other words, augmented reality may be defined as the reality created by blending real images as seen by the user and a virtual environment created by computer graphics, for example, a 3D virtual environment. Here, the 3D virtual environment may provide information necessary for real images as perceived by the user, where 3D virtual images, being blended with real images, may enhance the immersive experience of the user.

Compared with pure virtual reality techniques, augmented reality provides real images along with a 3D virtual environment and makes the physical world interwoven with virtual worlds seamlessly, thereby providing a better feeling of reality.

To exploit the advantages of augmented reality, research/development is now actively being conducted around the world on the techniques employing augmented reality. For example, commercialization of augmented reality is under progress in various fields including broadcasting, advertisement, exhibition, game, theme park, military, education, and promotion.

Due to improvement of computing power of mobile devices such as mobile phones, Personal Digital Assistants (PDAs), and Ultra Mobile Personal Computers (UMPCs); and advances of wireless network devices, mobile terminals of today have been improved so as to implement a handheld augmented reality system.

As such a system has become available, a plurality of augmented reality applications based on mobile devices have been developed. Moreover, as mobile devices are spread quite rapidly, an environment in which a user may experience augmented reality applications is being constructed accordingly.

In addition, user demand is increasing on various additional services based on augmented reality for their mobile terminal, and attempts are increasing to apply various augmented reality contents for users of mobile terminals.

The Korean public patent No. 10-2016-0092292 is related to a "system and method for providing augmented reality service of materials for promotional objects" and proposes a system that advertises a target object effectively by applying augmented reality to advertisement content to allow people exposed to the advertisement to easily obtain information related to the advertisement object and learn the details thereof by being immersed with interest.

Meanwhile, conventional augmented reality systems require construction of not only a dedicated augmented reality server but also applications to access the augmented reality server and operate the augmented reality. In other words, to realize an augmented reality service from conventional methods, the "server-app" components have to be constructed for each individual augmented reality service; therefore, a problem exists that more costs are required to construct a system rather than to create content.

PRIOR ART REFERENCES

Patent Reference (Patent reference 1) KR10-2016-0092292 A

SUMMARY OF THE INVENTION

The present invention has been made in an effort to solve the technical problem above and provides an augmented reality operating system capable of creating and distributing augmented reality content easily and quickly in the form of Uniform Resource Locator (URL) addresses by utilizing augmented reality Software as a Service (SaaS).

According to one embodiment of the present invention to solve the technical problem above, an augmented reality operating system comprises an augmented reality content management system providing a pre-assigned 3D virtual image to a web browser which has transmitted a URL address and a user terminal providing a URL address through the installed web browser, receiving the 3D virtual image from the augmented reality content management system, and displaying each physical object of actual image information displayed on the web browser by augmenting the physical object with a pre-assigned virtual object of the 3D virtual image.

Also, the augmented reality content management system provides current position information transmitted from the user terminal and the 3D virtual image corresponding to the actual image information to the user terminal in real-time; and identifies a physical object of the actual image information and provides a virtual object of the 3D virtual image, assigned to the identified physical object, to the user terminal.

Also, according to another embodiment of the present invention, an augmented reality content management system comprises a manager terminal accessing augmented reality software as a service of an augmented reality content management system via an installed web browser and creating augmented reality content by determining an augmentation position on a map, a physical object of actual image information located at the augmentation position, and a virtual object assigned to the physical object respectively; and in supporting creation of the augmented reality content based on the augmented reality software as a service, the augmented reality content management system providing a template for creating the augmented reality content on the web browser authorized as a manager and billing a payment according to the type of template used.

Also, the augmented reality content management system according to the present invention provides current position information transmitted from the manager terminal and a 3D virtual image corresponding to the actual image information to the manager terminal in real-time; and identifies a physical object of the actual image information and updates a virtual object of the 3D image information, assigned to the identified physical object, in real-time according to the control of the manager terminal.

Also, an augmented reality operating system according to yet another embodiment of the present invention comprises an augmented reality management system providing a pre-assigned 3D virtual image to a web browser which has transmitted a URL address in a distribution mode and in supporting creation of augmented reality content based on augmented reality software as a service in an authoring mode, providing a template for creating the augmented reality content on a web browser authorized as a manager and billing a payment according to the type of template used; a user terminal receiving the 3D virtual image from the augmented reality content management system by transmitting the URL address through an installed web browser and displaying each physical object of actual image information displayed on the web browser by augmenting the physical object with a pre-assigned virtual object of the 3D virtual image in a distribution mode; and a manager terminal accessing augmented reality software as a service of the augmented reality content management system via an installed web browser, creating the augmented reality content by determining an augmentation position on a map, a physical object of actual image information located at the augmentation position, and a virtual object assigned to the physical object respectively in an authoring mode.

Also, the augmented reality content management system according to the present invention provides current position information transmitted from the user terminal and the 3D virtual image corresponding to actual image information to the user terminal in real-time, identifies a physical object of the actual image information and provides a virtual object of the 3D virtual image, assigned to the identified physical object, to the user terminal in the distribution mode; and provides current position information transmitted from the manager terminal and a 3D virtual image corresponding to the actual image information to the manager terminal in real-time, identifies a physical object of the actual image information and updates a virtual object of the 3D image information, assigned to the identified physical object, in real-time according to the control of the manager terminal in the authoring mode.

DESCRIPTION OF EXEMPLARY EMBODIMENTS

In what follows, embodiments of the present invention will be described in detail with reference to appended drawings so that those skilled in the art to which the present invention belongs may readily apply the technical principles of the present invention.

Figure 1:
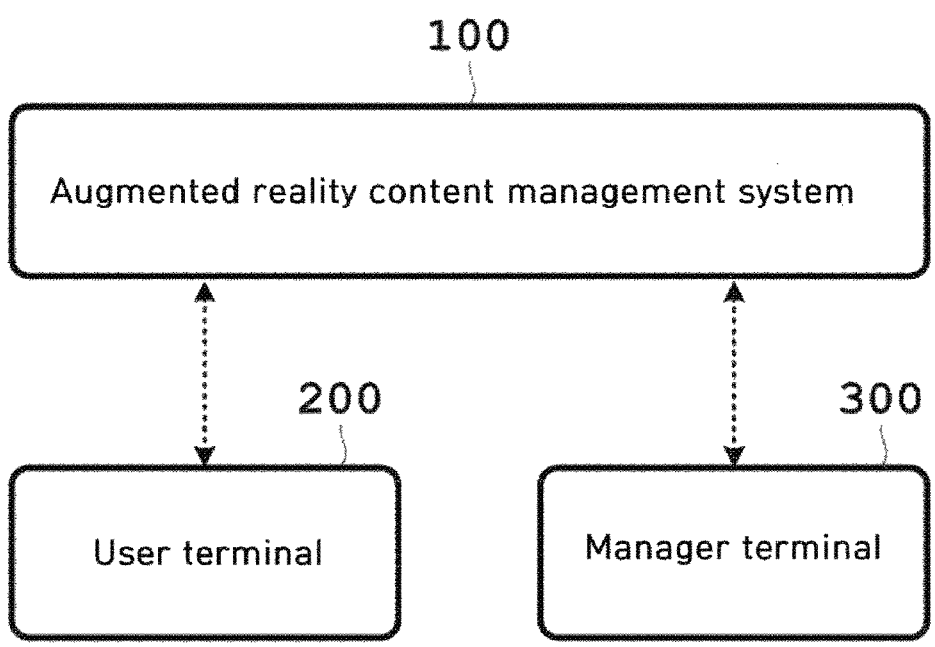
FIG. 1 illustrates a structure of an augmented reality operating system 1 according to an embodiment of the present invention.

FIG. 1 illustrates a structure of an augmented reality operating system 1 according to an embodiment of the present invention.

The augmented reality operating system 1 according to the present embodiment shows only a simplified structure for clearly describing the technical principles of the proposed invention.

Referring to FIG. 1, the augmented reality operating system 1 comprises an augmented reality content management system 100, user terminal 200, and manager terminal 300.

In what follows, the structure of the augmented reality operating system 1 as described above and main operations thereof will be described.

Figure 2:
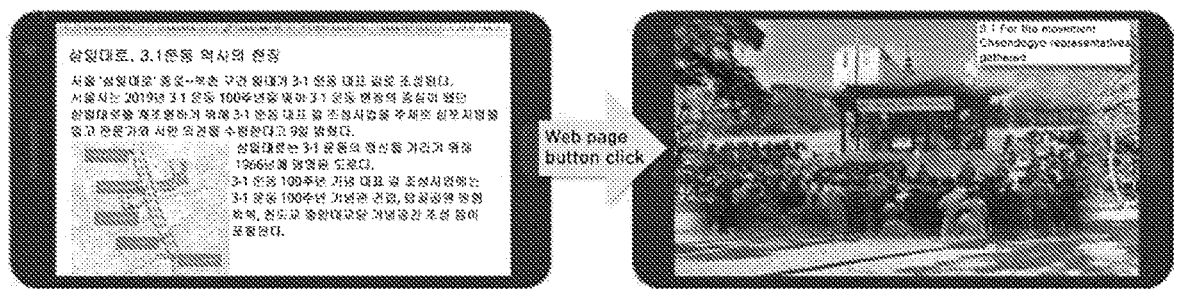
FIG. 2 illustrates an operation example of the augmented reality operating system 1 in a distributed mode.

FIG. 2 illustrates an operation example of the augmented reality operating system 1 in a distributed mode.

Referring to FIG. 2, the augmented reality content management system 100 in a distributed mode provides a pre-assigned, 3D virtual image to a web browser which has transmitted a URL address.

The user terminal 200 transmits a URL address via an installed web browser and receives a 3D virtual image from the augmented reality content management system 100.

In other words, the user terminal 200 displays each physical object of actual image information displayed on a web browser by augmenting a pre-assigned virtual object of the 3D virtual image on the physical object. FIG. 2 illustrates an experience screen showing augmented reality content on the web browser when a user clicks a button linked to a URL address at a web page displayed through the web browser of the user terminal 200.

Without executing a separate augmented reality application, the user terminal 200 may receive augmented reality content through the URL address via the installed web browser and display the received augmented reality content.

Figure 3:
FIGS. 3 to 5 illustrate operation examples of the augmented reality operating system 1 in an authoring mode.
Figure 4:
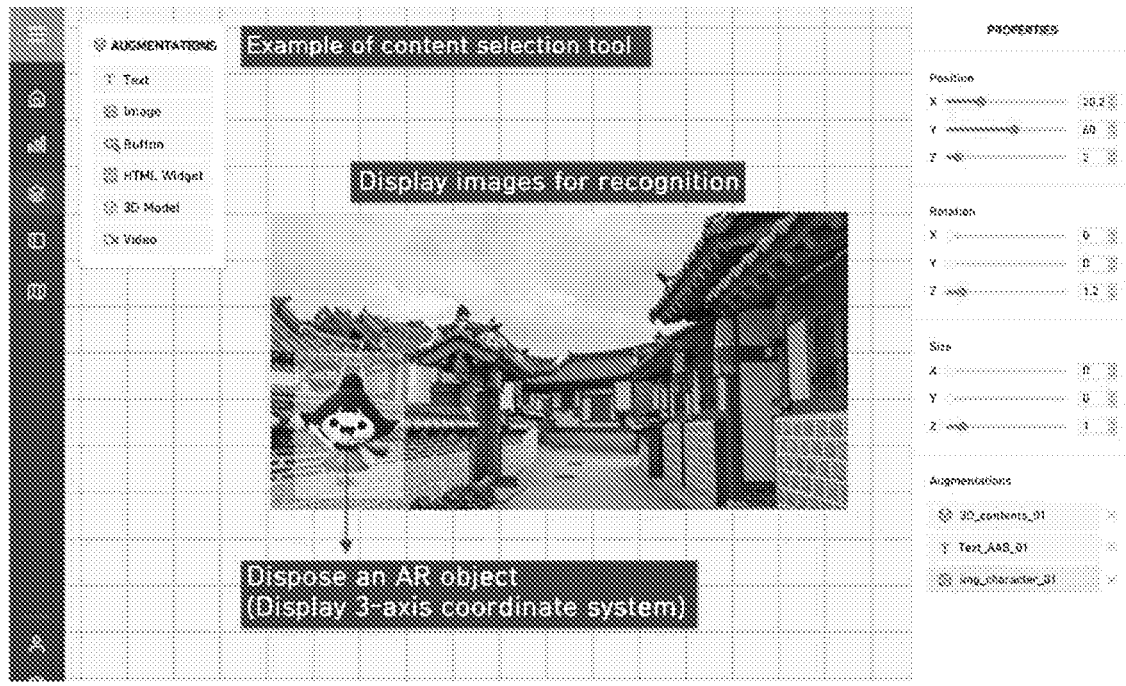
Figure 5:
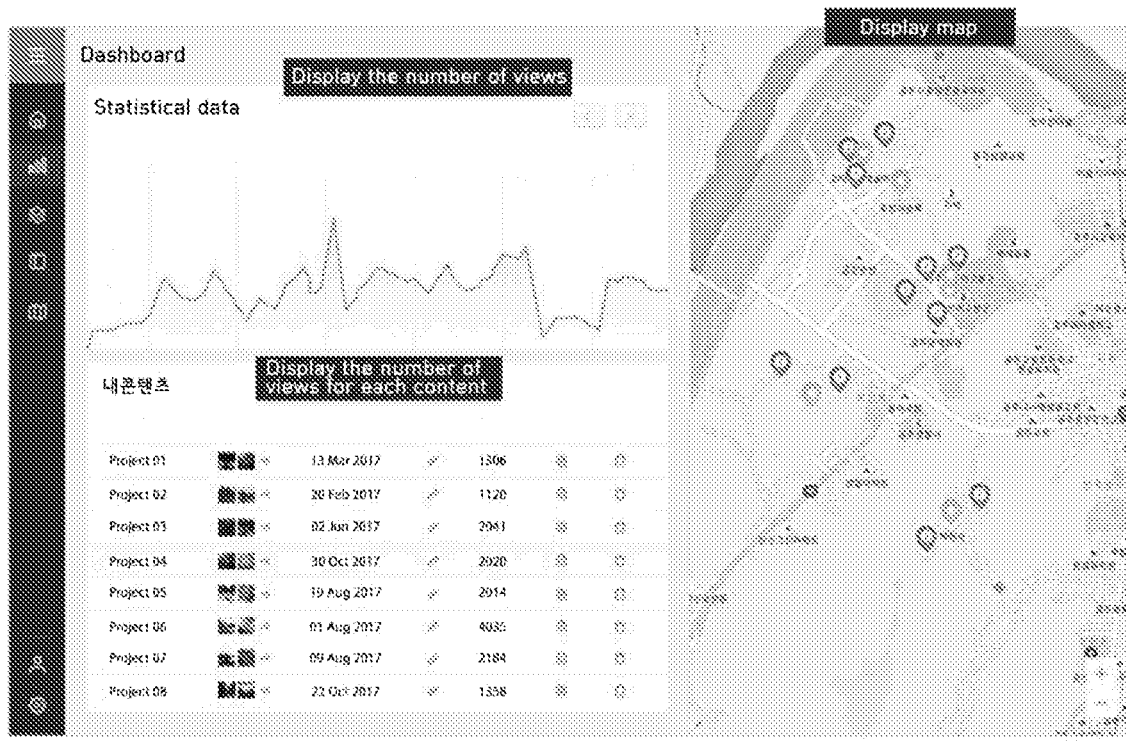

FIGS. 3 to 5 illustrate operation examples of the augmented reality operating system 1 in an authoring mode.

Referring to FIGS. 3 to 5, in the authoring mode, the manager terminal 300 accesses augmented reality Software as a Service (SaaS) of the augmented reality content management system 100 via an installed web browser and creates augmented reality content by determining an augmentation position on a map, a physical object of actual image information located at the augmentation position, and a virtual object assigned to the physical object respectively.

At this time, the augmented reality content management system 100 supports creation of augmented reality content based on augmented reality Software as a Service (SaaS). In other words, the augmented reality content management system 100 provides a template for creating the augmented reality content on the web browser authorized as a manager and bills a payment according to the type of template used.

Therefore, since a non-expert, who may not be a programmer, may more easily select a template to create augmented reality content and thereby concentrate on creation of content itself. Also, an advantage is obtained that since a user only has to pay for as many functions as the user has used, the user may produce content conveniently according to an allowed budget.

Also, a manager may check location, image, the total number of inquiries of augmented reality content per user, average, time series, cross analysis, and pattern analysis from a management page in the authoring mode. A management page provides an infographics function for intuitive visualization of a statistical analysis result.

Meanwhile, the augmented reality content management system 100 provides current position information transmitted from the user terminal 200 and a 3D virtual image corresponding to actual image information to the user terminal 200 in real-time; and identifies a physical object of the actual image information and provides a virtual object of the 3D virtual image, assigned to the identified physical object, to the user terminal in the distribution mode.

In other words, if current position information transmitted from the user terminal 200 and actual image information captured by a camera of the user terminal 200 is transmitted to the augmented reality content management system 100, the augmented reality content management system 100 identifies a physical object of the actual image information and transmits a virtual object of the 3D virtual image, assigned to the identified physical object, to the user terminal 200.

Also, the augmented reality content management system 100 provides current position information transmitted from the manager terminal 300 and a 3D virtual image corresponding to actual image information to the manager terminal 300 in real-time; and identifies a physical object of the actual image information and updates a virtual object of the 3D image information, assigned to the identified physical object, in real-time according to the control of the manager terminal in the authoring mode.

In other words, while checking an augmented virtual object by using the manager terminal 200, the manager may edit the virtual object on-site, in real-time by performing an operation such as replacing the virtual object or changing the position thereof.

Figure 6:
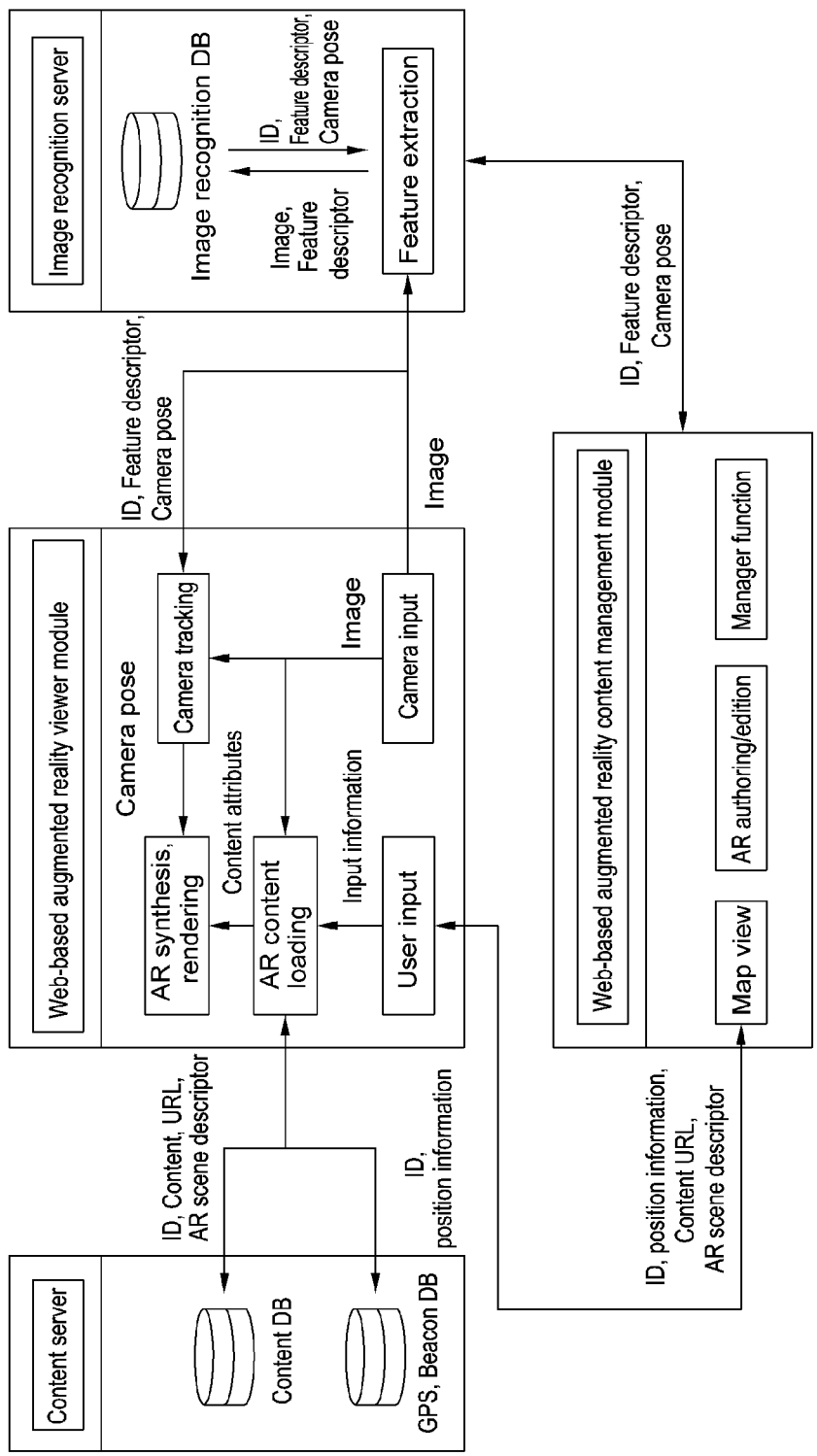
FIG. 6 illustrates a structure of an augmented reality content management system 100 of the augmented reality operating system 1.

FIG. 6 illustrates a structure of an augmented reality content management system 100 of the augmented reality operating system 1.

Referring to FIG. 6, the augmented reality operating system 1 comprises a content server, web-based augmented reality viewer module, image recognition server, and web-based augmented reality content management module.

The content server is equipped with a database containing position information of objects, physical objects, and virtual objects. Also, the web-based augmented reality viewer module receives a physical object and position information from a web browser and transmits a virtual object assigned to the physical object. Also, the image recognition server performs the role of identifying image features and distinguishing individual images. The web-based augmented reality content management module provides a map view and provides functions related to the authoring mode and functions related to the manager.

The augmented reality operating system 1 is defined as a system by which any one may create and distribute augmented reality content easily at a very low cost.

In other words, the present invention proposes the web-based augmented reality content management system 100 for creating and managing augmented reality content, thereby allowing a non-expert to easily create augmented reality content.

Also, the present invention proposes the first, web-based, Software as a Service (SaaS)-based augmented reality content management system, by which a non-expert may create/distribute augmented reality content easily and quickly, at a very low cost. Also, via a web browser, a user may experience augmented reality content without installing a separate application. Also, the user may visit an augmented reality site to experience augmented virtual objects via a web browser. At this time, the web browser may be equipped with a navigation function to guide the user to the augmented reality site.

The augmented reality operating system 1 is capable of creating and managing augmented reality content at a very low cost by using augmented reality Software as a Service (SaaS)-based rental software.

Also, if content is updated by utilizing an augmented reality content management system based on augmented reality Software as a Service (SaaS), updates are automatically reflected in the web-based augmented reality viewer module, by which maintenance is made easy. Therefore, customers may concentrate on creation of content itself rather than to strive for system construction. Also, since it is possible to figure out the types of content desired by users by analyzing usage information of augmented reality content, the proposed invention may contribute to determine the direction for content production.

Demand for creating and distributing augmented reality content directly is increasing from public organizations, companies, and individuals; however, since it is not easy to overcome technology barriers and high costs are required for the initial system construction/maintenance, widespread use of augmented reality content is not easily achieved.

To solve the problem above, the augmented reality operating system 1 provides a means for easily create, manage, and analyze augmented reality content without coding the augmented reality content; and to improve accessibility to the content, the augmented reality operating system 1 provides a method for accessing augmented reality content conveniently through a URL address without installing a separate application.

Also, an augmented reality content management system (CMS) has been developed in the form of a web-based augmented reality Software as a Service (SaaS), which adopts a flexible billing policy that charges only for the functions actually used. Also, a management page is provided, by which content production/advertisement policy may be developed through content big data collection and data mining.

The augmented reality operating system 1 employs a traffic manager to which a CMS server and an augmented reality recognition server are added for large-scale image recognition (about 100,000 images) and control of network traffic of the augmented reality content management system.

Also, the augmented reality operating system 1 employs a database for position and image recognition and an augmented reality learning server. In other words, cloud-based object (space) image feature learning techniques and position information-based matched coordinate system registration techniques are applied. Also, the augmented reality operating system 1 is equipped with an augmented reality content database (DB) and server that manages content augmented after image recognition.

Also, the augmented reality operating system 1 is equipped with a database (DB) and server for managing accounts/rights and user groups. Also, the augmented reality operating system 1 is equipped with a database (DB) and server that manages resources of the augmented reality content management system for each user. Also, the augmented reality operating system 1 may be equipped with a database (DB) and server for information analysis.

Also, the augmented reality operating system 1 employs image recognition, load balancing for managing traffic of content and resources, and traffic manager techniques; and responds to a DNS request incoming according to a routing policy via a normal end-point.

Also, the augmented reality operating system 1 may support round robin distribution of traffic, cookie-based session preference, and URL path-based routing function through the layer 7 load distribution function. Also, the augmented reality operating system 1 provides the layer 4 load balance with high performance and low latency for all of UDP and TCP protocols and is capable of inbound and outbound connection management.

Also, the database is composed of database transaction units (DTUs) and elastic DTUs (eDTUs) that are able to react flexibly to the database (DB) load. Also, through the DTUs, relative performance measures of resources between SQL databases may be calculated, and an adaptive pool of databases is constructed through the eDTUs, by which a performance goal that is dynamically changed and difficult to predict may be managed. Also, transmission and reception of augmented reality authoring information based on RESTful APIs is possible.

The augmented reality operating system 1 is organized to provide basic performance that larger-scale image recognition and processing (about 100,000 images) is performed within 2 seconds and a response time of the augmented reality management system for resource loading is kept within 3 seconds.

As described above, the augmented reality operating system 1 supports production of augmented reality content based on the augmented reality Software as a Service (SaaS).

In other words, the augmented reality operating system 1 allows the user to configure an experience position by using map-based GPS coordinate setting and content clustering functions and to configure the radius of augmentation by designating the radius of experience and radius on the map.

Also, the augmented reality operating system 1 proceeds with registration of images for recognition by displaying file upload and image recognition rate and supports authoring of text content by providing color, position, rotation, size, and editing functions.

Also, the augmented reality operating system 1 supports authoring of memo/drawing content by providing color, position, rotation, size, and Undo/Redo functions. Also, the augmented reality operating system 1 supports authoring of image and GIF content by providing position, rotation, and size setting functions. Also, the augmented reality operating system 1 supports authoring of screen skins by providing screen skin setting with reference to screen coordinate system, image insertion, size adjustment, and so on. Also, the augmented reality operating system 1 supports authoring of audio content by providing play button insertion function and so on. Also, the augmented reality operating system 1 supports authoring of video and 360-degree video content by providing video portal (YouTube) link input, position, rotation, and size functions.

Also, the augmented reality operating system 1 supports authoring of web page links by adding a web page link input so that a linked web page appears when the link is clicked.

Also, the augmented reality operating system 1 supports authoring of 3D model content by supporting a web-based model loader, implementation of an animation control function, and position and size setting function, and so on.

Also, the augmented reality operating system 1 is configured to determine a period during which augmented reality content is exposed and a maximum number of inquiries, by which supports a function for managing the exposure period/the number of inquires Also, the augmented reality operating system 1 may be configured to determine a reward (image or text content) to be provided when a user experiences augmented reality content and to determine a reward period and the maximum number of issues to support a reward registration and management functions.

Also, the augmented reality operating system 1 supports an account management, rights, and group setting functions through rights managements of individual authoring functions, augmented reality content experience group setting function, user group setting function, and invitation function. Also, the augmented reality operating system 1 supports a content storage function in the server database (DB) after authoring is completed.

Figure 7:
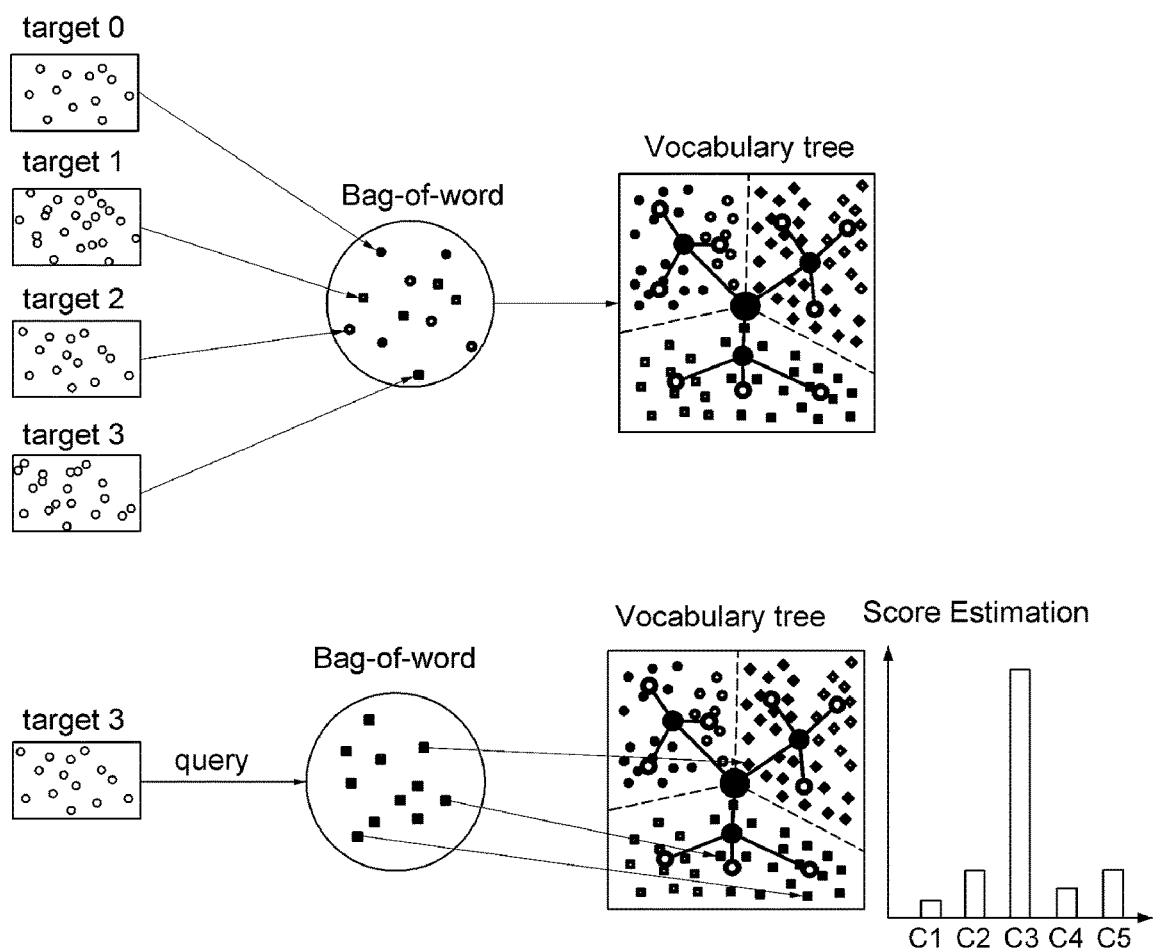
FIG. 7 illustrates a real-time image search method based on a hierarchical tree-type data structure.

FIG. 7 illustrates a real-time image search method based on a hierarchical tree-type data structure.

Referring to FIG. 7, the augmented reality operating system 1 applies a technique that learns a plurality of images in the form of tree-type data structure suitable for extraction and matching of image features and performs real-time recognition and detection of input images based on the learning result. In other words, image detection and camera pose acquisition techniques are combined with 3D spatial tracking techniques.

Through dynamic generation of Bag-of-visual Words (BoW) based hierarchical tree-type data structure, the augmented reality operating system 1 supports dynamic learning and search tree generation for large-scale image learning.

Also, the augmented reality operating system 1 supports enhancement of recognition speed by using image query generation and per-class histogram scoring techniques through bag-of-word construction based on binary descriptors.

Also, the augmented reality operating system 1 supports enhancement of recognition speed through small scale image feature clustering per position and user ID and dynamic data structure generation technique.

Also, the augmented reality operating system 1 supports position information based image query generation and acquisition of real-time target image ID and matching data.

Also, the augmented reality operating system 1 supports 2D homography matrix detection and real-time acquisition of camera rotation matrix and translation vector by matching image feature information obtained from the database (DB) to the input image.

Also, the augmented reality operating system 1 supports association of camera pose determined from images with Simultaneous Localization And Mapping (SLAM) or Visual Inertial Odometry (VIO), which is a spatial tracking technique performed with reference to an arbitrary 3D coordinate system.

Also, the augmented reality operating system 1 employs multi-image target recognition technique to ensure derivation of a result within 2 seconds after an inquiry is generated and recognition rate of 95% or more. Also, if the image target detection technique is operated in conjunction with spatial tracking technique, recognition speed of 30 fps or more may be obtained.

Also, the augmented reality operating system 1 supports to record and analyze big data such as user log information, content view information, and advertisement effect; and to analyze the pattern of the big data. In other words, the big data analysis result may be used to improve usability, find content preferred by users, and develop a strategy for increasing profits.

Also, the augmented reality operating system 1 supports user group analysis (cross analysis); tracking advertisement (advertisement channel); setting country, date, OS version, and cross analysis variables; advertisement analysis/tracking link; convenient and simple tracking of link issue and management thereof; advertisement channel integrated reporting (ROI, LTV, Retention); filter function that allows conditional search (for each channel, landing URL, attribute, and manager) and excel downloading function; authorization and management of partner companies; and implementation of a postback interworking function with various media companies.

As an example, the augmented reality operating system 1 supports setting of position and image, content, the number of reward registration, and exposure period; setting of augmentation radius; setting of content storage space; setting of monthly traffic limit; and download speed, public/private, and group setting.

Also, the augmented reality operating system 1 supports interoperation of augmented reality content among a server, mobile augmented reality content management system, and augmented reality viewer app; compensation technique for matched coordinate system based on internal sensor information of a mobile device; and sensor fusion-based mobile camera tracking technique.

Meanwhile, other functions of the augmented reality operating system 1 will be described.

The user terminal 100 is equipped with a video camera that captures a scene in the surroundings of a user and provides actual image information; and in displaying a 3D virtual image on a display, display the 3D virtual image corresponding to the current position information and actual image information on the display via a web browser.

The augmented reality management system 100 provides, to the user terminal 200, 3D virtual image corresponding to current position information and actual image information transmitted from the user terminal 200 in real-time.

By default, the user terminal 200 is configured to provide satellite position information to the augmented reality content management system 100 as the current position information.

When a communication module is included in the user terminal 200, not only the satellite position information but also the position of a nearby Wi-Fi repeater, position of a base station, and so on may be additionally provided to the augmented reality content management system 100 as the current position information.

In particular, since it is often the case that the satellite position information is unavailable in indoor environments, the user terminal 200 may additionally detect signal strength of at least one or more Wi-Fi repeaters found and transmit the detected signal strength to the augmented reality content management system 100. In other words, since the absolute positions of indoor Wi-Fi repeaters are pre-stored in the augmented reality content management system 100, if the user terminal 200 additionally provides a unique number and signal strength of a searched Wi-Fi repeater, the augmented reality content management system 100 may determine a relative travel path of the user terminal 200.

In other words, a relative distance between the user terminal 200 and Wi-Fi repeater may be determined from signal strength, and a travel direction may be calculated based on the change of signal strength with respect to a nearby Wi-Fi repeater. Additional methods for obtaining the current position information in an indoor environment will be described later.

Therefore, the augmented reality content management system 100 determines a virtual object assigned to each physical object through the current position information of the user carrying the user terminal 200 and the actual image information captured by the video camera of the user terminal 200; and transmits the information about the virtual object to the user terminal 200 in real-time.

The augmented reality content management system 100 identifies a physical object of actual image information and provides a virtual object of a 3D virtual image, assigned to the identified physical object, to the user terminal 200, where the user terminal 200 is equipped with a 9-axis sensor to obtain its own 3D pose information, and poses of at least one or more virtual objects selected in the user terminal 200 may be changed in synchronization with the 3D pose information.

At this time, coordinates of at least one or more virtual objects selected in the user terminal 200 are transformed to the mobile coordinate system of the user terminal 200 from the spatial coordinate system for actual image information, and coordinates of a virtual object released from selection are transformed to the spatial coordinate system for actual image information from the mobile coordinate system of the user terminal 200. Detailed descriptions of the coordinate transformation will be given later.

When the user moves the user terminal 200 in the 3D space, a selected virtual object is synchronized with the 3D motion, and the pose of the selected virtual object is automatically changed. The 9 axis sensor is so called because measurement is performed along a total of 9 axes comprising 3 axis acceleration outputs, 3 axis inertial outputs, and 3 axis geomagnetic outputs, where temperature sensors may be added for temperature compensation. The 9 axis sensor may detect not only the 3D movement of a mobile terminal but also the forward-looking direction, movement direction, and inclination of the user.

Figure 8A:
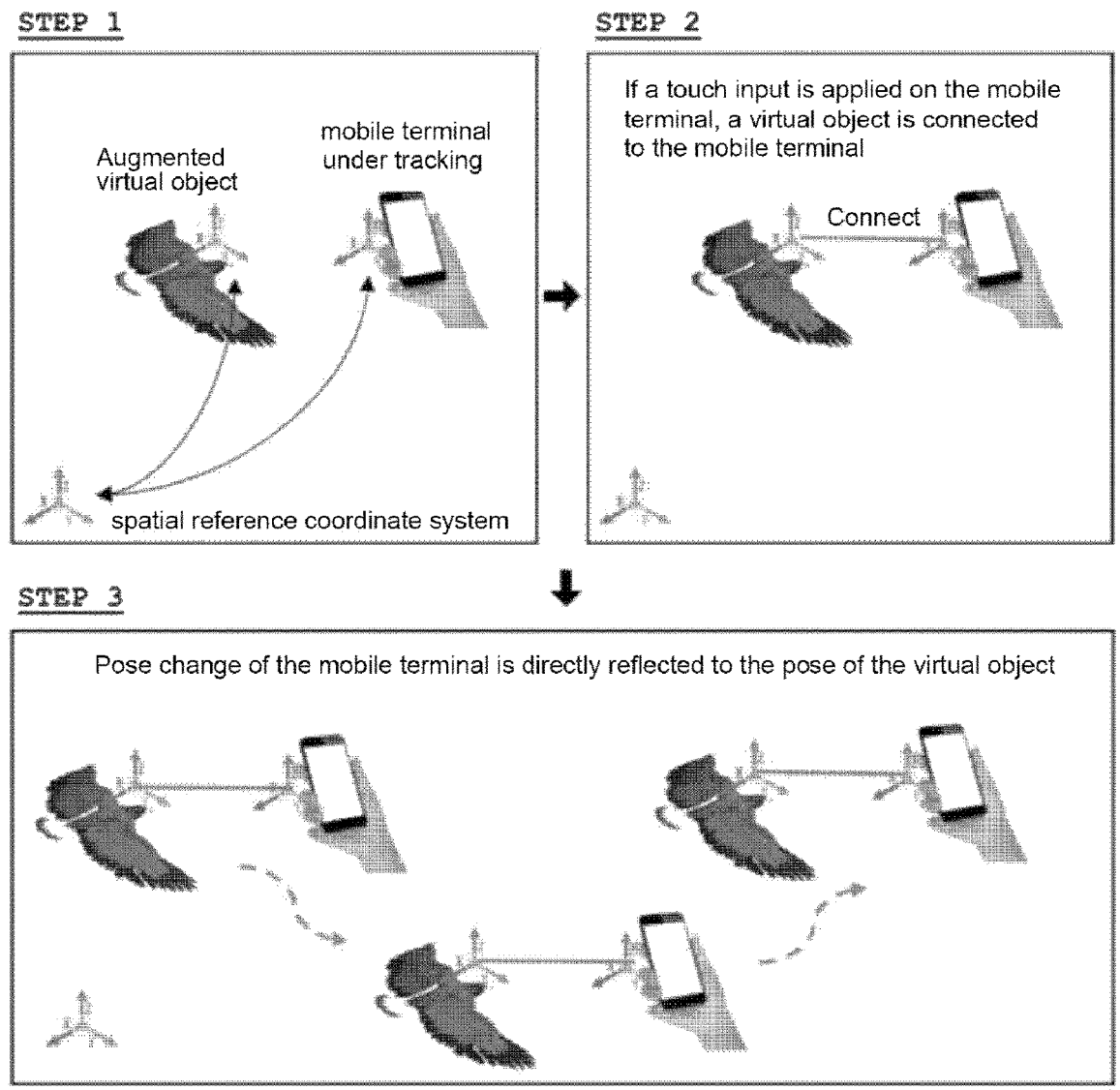
FIGS. 8a and 8b illustrate an example where a virtual object is moved in the augmented reality operating system 1.
Figure 8B:
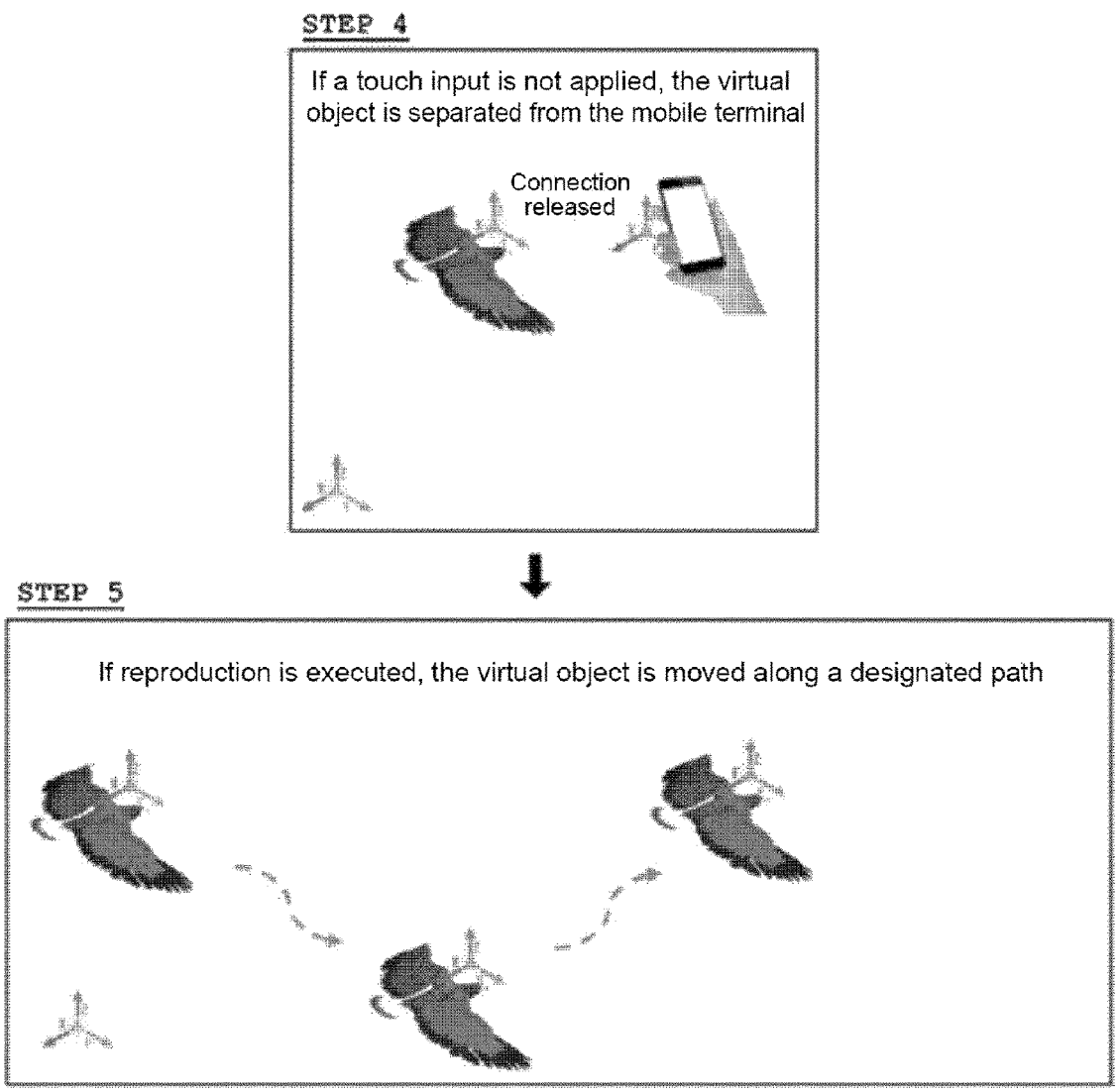

FIGS. 8a and 8b illustrate an example where a virtual object is moved in the augmented reality operating system 1.

Referring to FIGS. 8a and 8b, in the step 1, virtual objects are enhanced in the space with respect to a spatial coordinate system and displayed on the display of the user terminal 200.

In the step 2, the user selects a virtual object. If the user touches one or more virtual objects displayed on the display (touchscreen) of the user terminal 200, the selected virtual object is connected to the user terminal 200. Here, connection implies that the reference coordinate system of the virtual object has been changed from the spatial coordinate system to the coordinate system of the user terminal 200.

In the step 3, while the virtual object is being touched, if the user terminal 200 is moved or rotated, translation or rotation information of the virtual object connected to the user terminal 200 is changed in 3D by being synchronized with the 3D motion of the user terminal 200.

In the step 4, if the user does not touch the virtual object, the virtual object is separated from the user terminal 200. Here, separation implies that the reference coordinate system of the virtual object has been changed from the coordinate system of the user terminal 200 to the spatial coordinate system.

In the step 5, a video showing attitude change of the virtual object in synchronization with the 3D pose information of the user terminal 200 is stored for reproduction afterwards. In other words, if a video showing attitude change of the virtual object is stored, the recorded information may be retrieved and reproduced by pressing a play button afterwards.

In the step 2 to step 4 of the example above, only when the virtual object is in a touched state, the reference coordinate system of the touched virtual object is changed from the spatial coordinate system to the coordinate system of the user terminal 200, and the virtual object is moved in conjunction with the 3D motion of the user terminal 200.

Depending on embodiments, if the user touches a virtual object for more than a predetermined time period, the virtual object may be selected, and if the virtual object is touched again for more than a predetermined time period, selection of the virtual object may be released.

Figure 9:
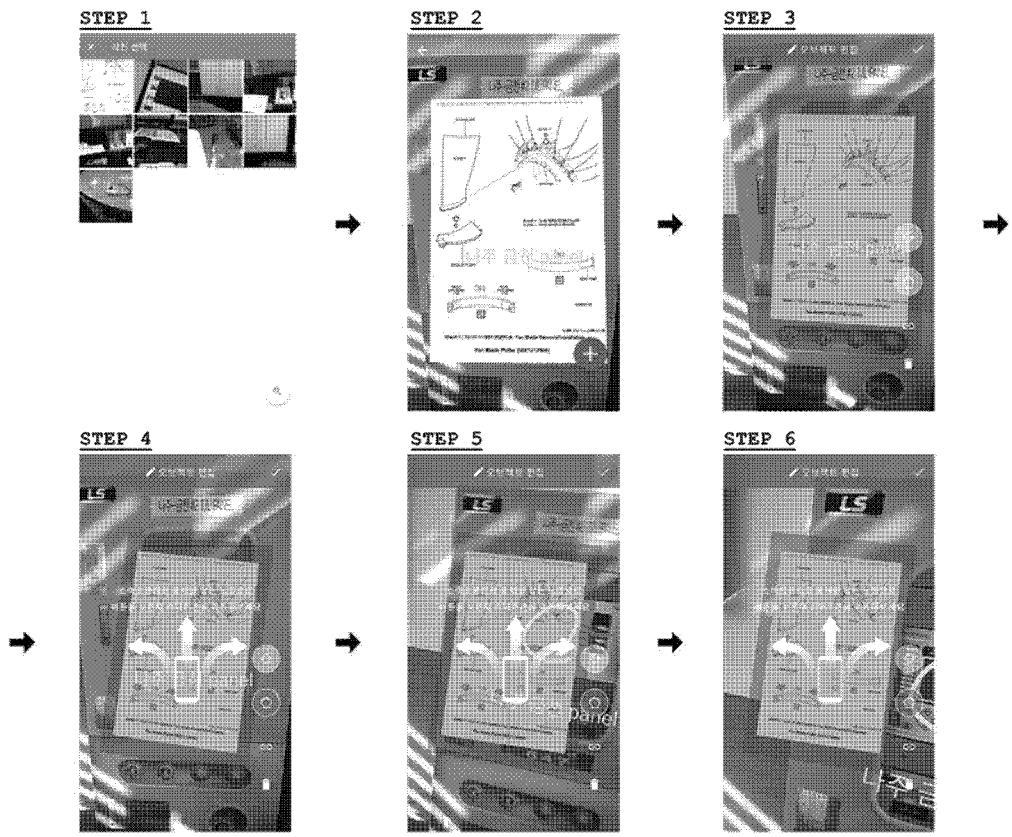
FIG. 9 illustrates another example where a virtual object is moved in the augmented reality operating system 1.

FIG. 9 illustrates another example where a virtual object is moved in the augmented reality operating system 1.

Referring to FIG. 9, if the user terminal 200 loads augmented reality contents and displays a virtual object, the user selects the virtual object and changes the coordinate system of the corresponding virtual object to the mobile coordinate system. Afterwards, the selected virtual object is moved in conjunction with the 3D motion of the user terminal 200.

Figure 10:
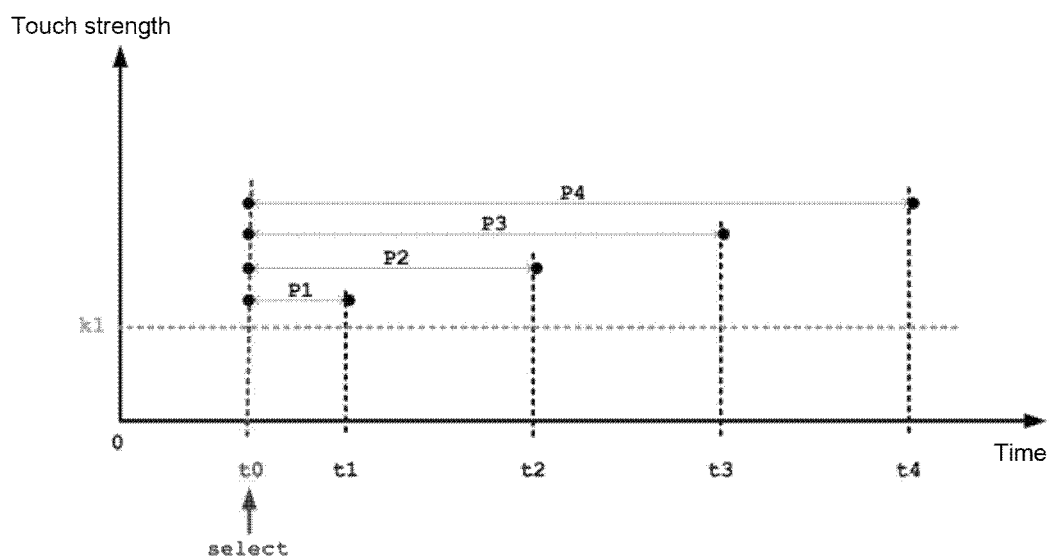
FIG. 10 illustrates a condition for selecting a virtual object in the augmented reality operating system 1.

FIG. 10 illustrates a condition for selecting a virtual object in the augmented reality operating system 1.

Referring to FIG. 10, in order for the user to select a virtual object displayed on the display of the user terminal 200, the method described above may be applied, where, if the user touches the virtual object for more than a predetermined time period t0, the virtual object is selected, and if the user touches the virtual object again for the predetermined time period t0, selection of the virtual object is released.

At this time, it is preferable that a touch input period for a virtual object is considered to be valid only when the display is touched with more than predetermined pressure k1.

In other words, if the user touches a virtual object for more than a predetermined time period t0, the virtual object is selected, the reference coordinate system of the virtual object is changed from the spatial coordinate system to the coordinate system of the user terminal 200, and the virtual object is moved in conjunction with a 3D motion of the user terminal 200.

At this time, according to the duration of the touch after the virtual object is touched for more than a predetermined time period t0, the time period for storing a video showing attitude change of the virtual object may be automatically configured.

As shown in FIG. 10, when the user continues to touch a virtual object until a first time t1 after having touched the virtual object up to more than a predetermined time t0, a storage time period P1 ranging from the predetermined time t0 to the first time t1 is automatically configured. Therefore, as duration of touch on the virtual object is made longer, the storage time period becomes further elongated, where the storage time period is set as a multiple of the touch duration. At this time, the storage time period is counted from the initial movement of the virtual object.

At this time, the automatically configured storage time is displayed in the form of a time bar on the display, and estimated time to completion is displayed in real-time. At this time, if the user drags the time bar to the left or right, the estimated time is increased or decreased. In other words, the automatically configured storage time may be increased or decreased according to the dragging motion of the user.

Meanwhile, a camera capable of capturing the user's face may be additionally installed to the direction of the display in the user terminal 200. This camera is capable of capturing a 3D image and recognize the physical body of the user, particularly, a 3D image (depth image) of the face.

Therefore, if a body association model is set, the camera may detect at least one or more of 3D motion of the user's head, 3D motion of the finger, and 3D motion of the pupil, and a virtual object may be configured to move in synchronization with the detected motion. At this time, the head motion, finger motion, and pupil motion may be configured to be selected separately or a plurality of the motions may be configured to be selected for motion detection.

Meanwhile, the augmented reality operating system 1 according to an embodiment of the present invention may determine an additional recognition area and identify similar objects by assigning unique identifiers to the respective physical objects based on an image difference of the additional recognition area.

Also, the augmented reality operating system 1 may identify physical objects by taking into account all of the unique identifiers assigned to the respective physical objects based on the image difference of the additional recognition area and current position information of each physical object.

Therefore, even if physical objects with a high similarity are arranged, the physical objects may be identified, virtual objects assigned to the respective physical objects may be displayed, and thereby unambiguous information may be delivered to the user.

Visual recognition may be divided into four phases: Detection, Classification, Recognition, and Identification (DCRI).

First, detection refers to a phase where only the existence of an object may be known.

Next, classification refers to a phase where the type of the detected object is known; for example, whether a detected object is a human or an animal may be determined.

Next, recognition refers to a phase where overall characteristics of the classified object are figured out; for example, brief information about clothes worn by a human is obtained.

Lastly, identification refers to a phase where detailed properties of the recognized object are figured out; for example, face of a particular person may be distinguished, and the numbers of a car license plate may be known.

The augmented reality operating system 1 of the present invention implements the identification phase and thereby distinguishes detailed properties of similar physical objects from each other.

For example, the augmented reality operating system 1 may recognize characters attached to particular equipment (physical object) having a similar shape and assign a unique identification number thereto or identify a part of the physical object exhibiting a difference from the others, determine the identified part as an additional recognition region, and by using all of the differences of 2D/3D characteristic information of the additional recognition region, satellite position information, and current position information measured through a Wi-Fi signal, distinguish the respective physical objects having high similarities from each other.

Figure 11A:
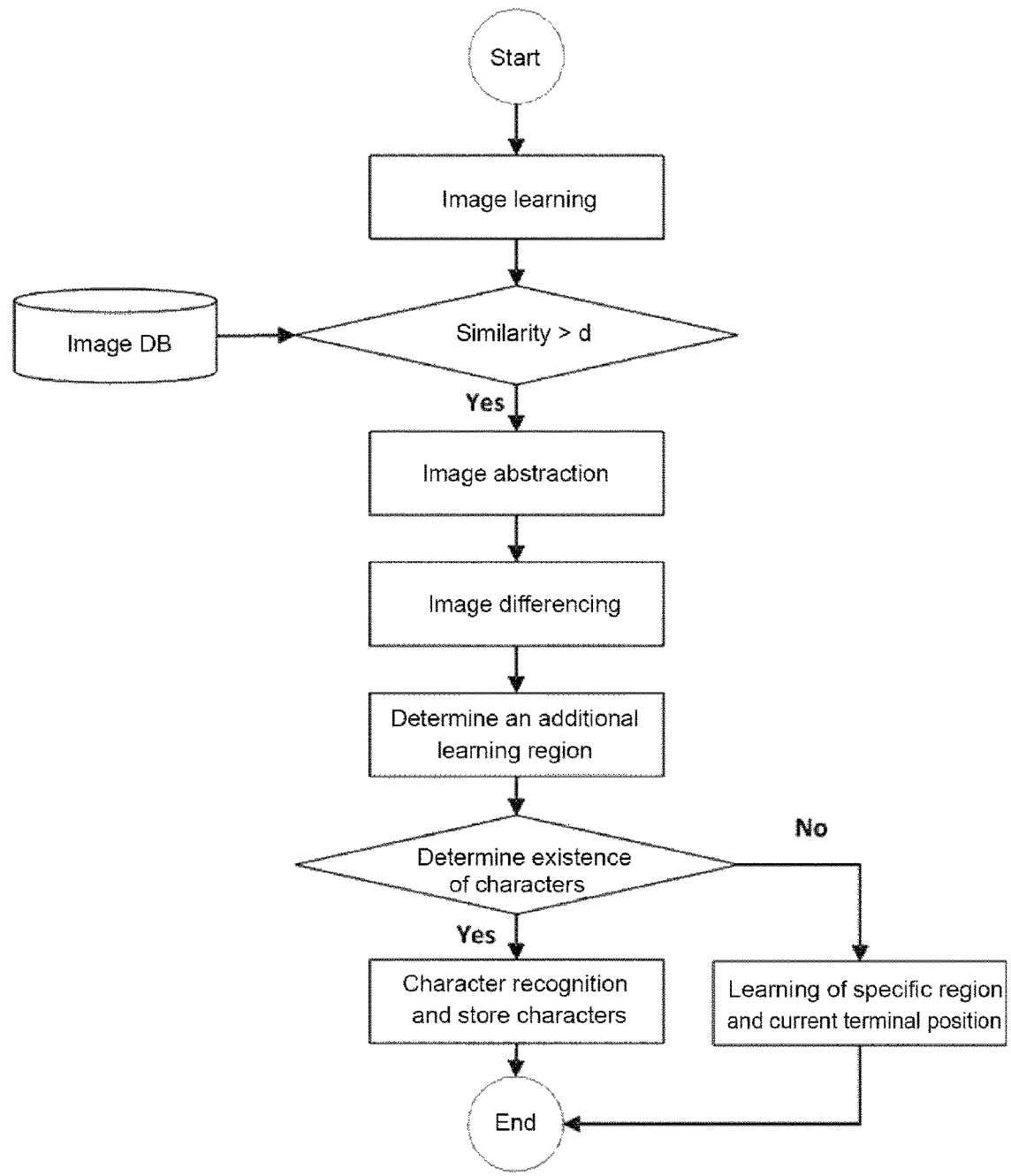
FIG. 11a is a flow diagram illustrating a learning process for identifying similar objects in the augmented reality operating system 1.
Figure 11B:
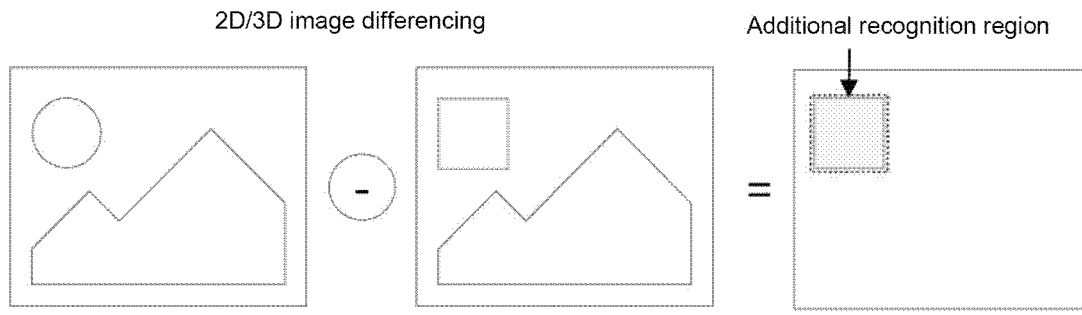
FIG. 11b illustrates a process for determining an additional recognition area for identifying similar objects in the augmented reality operating system 1.

FIG. 11a is a flow diagram illustrating a learning process for identifying similar objects in the augmented reality operating system 1, and FIG. 11b illustrates a process for determining an additional recognition area for identifying similar objects in the augmented reality operating system 1.

Referring to FIGS. 11a and 11b, the augmented reality content management system 100 operates to identify a physical object of actual image information and provide the user terminal 200 with a virtual object of a 3D virtual image assigned to the identified physical object.

In other words, among a plurality of physical objects present in the actual image information, the augmented reality content management system 100 determines additional recognition regions by subtracting the physical objects showing a predetermined degree of similarity d from the corresponding actual image information and assigns unique identifiers to the respective physical objects based on the visual differences of the additional recognition regions.

For example, if additional recognition regions contain different characters or numbers, the augmented reality content management system 100 may assign unique identifiers to the respective physical objects based on the differences among the additional recognition regions, store the assigned unique identifiers in the form of a database, and transmit virtual objects assigned to the respective unique identifiers to the user terminal 200.

In other words, if a plurality of physical objects have a visual similarity larger than a predetermined value d, the image is abstracted and subtracted to determine additional recognition regions (additional learning regions), and then unique identifiers are assigned to the respective physical objects by identifying the differences of the additional recognition regions.

Figure 12:
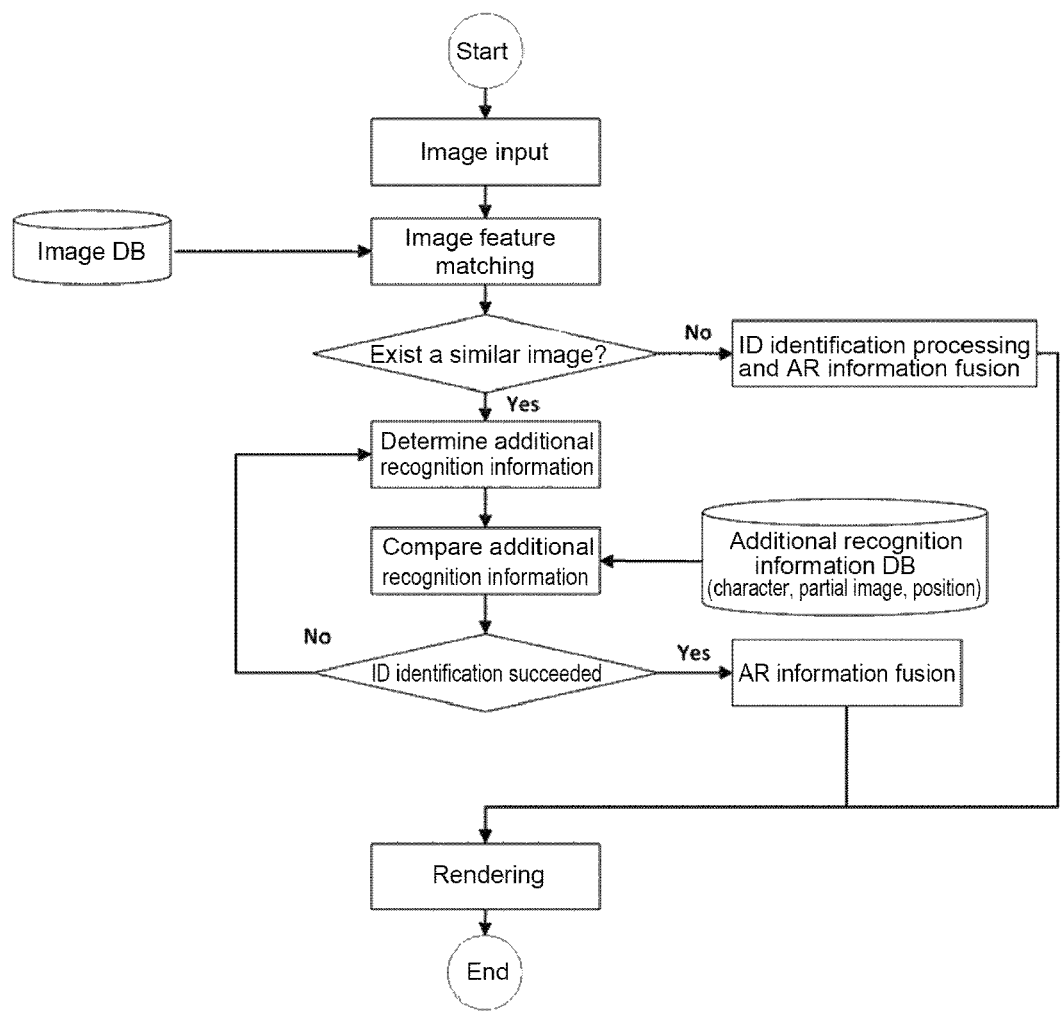
FIG. 12 is a flow diagram illustrating a process for identifying similar objects in the augmented reality operating system 1.
Figure 13:
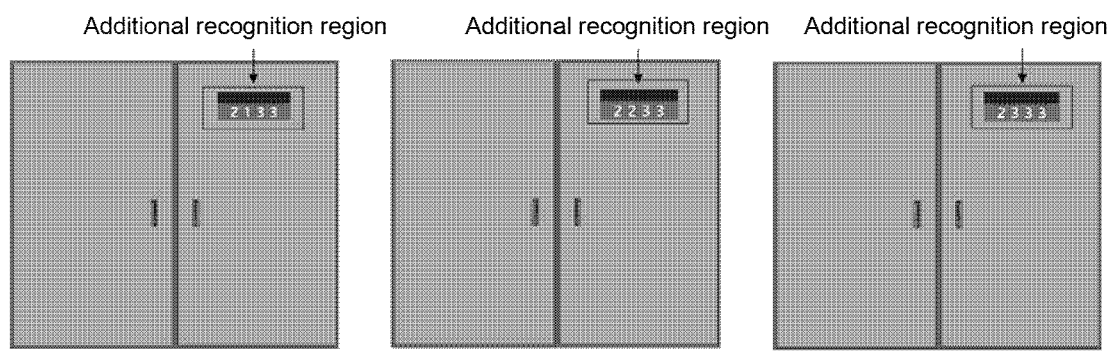
FIG. 13 is a first example illustrating a state for identifying similar objects in the augmented reality operating system 1.

FIG. 12 is a flow diagram illustrating a process for identifying similar objects in the augmented reality operating system 1, and FIG. 13 is a first example illustrating a state for identifying similar objects in the augmented reality operating system 1.

Referring to FIGS. 12 and 13, if actual image information is received from the user terminal 200, the augmented reality content management system 100 distinguishes a physical object of the actual image information, and if similar images are not found (if physical objects having a similar shape are not found), a virtual object corresponding to the identified image is assigned.

At this time, in the presence of similar objects (in the presence of physical objects with a similar shape), the augmented reality content management system 100 compares the information of the additional recognition regions and identifies unique identifiers and then allocates a virtual object corresponding to each unique identifier.

In other words, as shown in FIG. 13, if particular equipment (physical object) having a similar shape is disposed in the vicinity, the augmented reality content management system 100 may recognize a plurality of physical objects from actual image information transmitted from the user terminal 200, identify unique identifiers by comparing information of additional recognition regions of the respective physical objects, and assign a virtual object corresponding to each unique identifier identified from the corresponding additional recognition region.

Meanwhile, when a different identifying marker is printed on the additional recognition region of each equipment, the shape of the identifying marker may be composed as follows.

An identifying marker may be composed of a first identifying marker region, second identifying marker region, third identifying marker region, and fourth identifying marker region.

In other words, the first, second, third, and fourth identifying markers are recognized as one identifier. In other words, by default, the user terminal 200 captures all of the first to the fourth identifying markers and transmits the captured identifying markers to the augmented reality content management system 100; and then the augmented reality content management system 100 regards the recognized identifying markers as a single unique identifier.

At this time, the first identifying marker is constructed to reflect visible light. In other words, the first identifying marker region is printed with a normal paint so that a human may visually recognize the marker.

Also, the second identifying marker reflects light in a first infrared region, which is printed with a paint that reflects light in the first infrared region and is not recognizable by a human.

Also, the third identifying marker reflects light in a second infrared region, in which wavelength of light is longer than that of the light in the first infrared region. The third identifying marker is printed with a paint that reflects light in the second infrared region and is not recognizable by a human.

Also, the fourth identifying marker reflects light in the first and second infrared regions simultaneously, which is printed with a paint that reflects light in both of the first and second infrared regions and is not recognizable by a human.

At this time, the camera of the user terminal 200 that captures the identifying markers is equipped with a spectral filter that adjusts infrared transmission wavelength and is configured to recognize the identifying markers by capturing the infrared wavelength region.

Therefore, among the identifying markers printed on the equipment, only the first identifying marker may be checked visually by a human while the second, third, and fourth identifying marker regions may not be visually checked by the human but may be captured only through the camera of the user terminal 200.

The relative print positions (left, right, up, and down) of the first, second, third, and fourth identifying markers may be used as identifiers. In the identifying marker region, various characters such as numbers, symbols, or codes may be printed. Also, identifying markers may also be printed in the form of an QR code or barcode.

Figure 14:
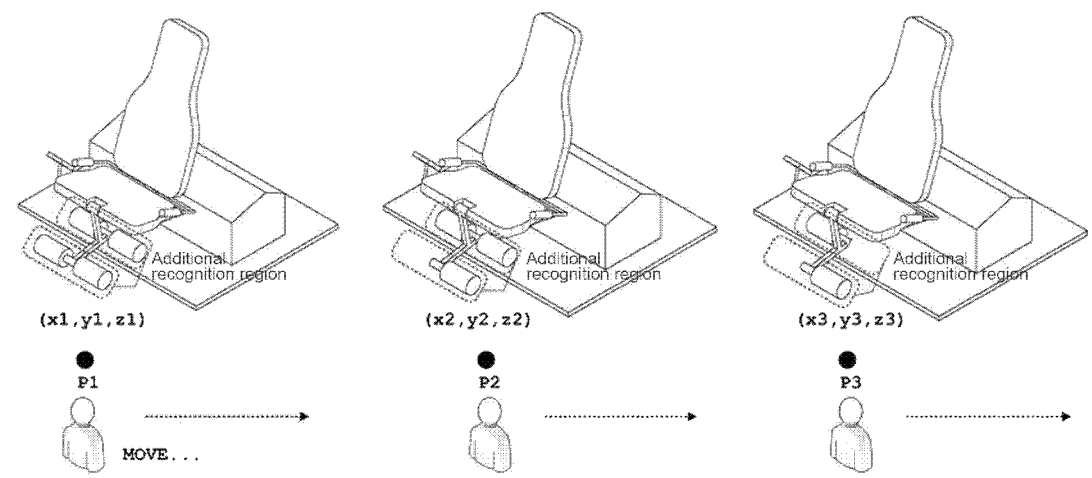
FIG. 14 is a second example illustrating a state for identifying similar objects in the augmented reality operating system 1.

FIG. 14 is a second example illustrating a state for identifying similar objects in the augmented reality operating system 1.

Referring to FIG. 14, the augmented reality content management system 100 may identify each physical object by considering all of the unique identifier assigned to the physical object based on an image difference of the corresponding additional recognition region and current position information of the physical object. In other words, a physical object may be identified by additionally considering the current position information of the user (user terminal 200).

For example, if a plurality of physical objects maintain a predetermined separation distance from each other, even a physical object showing a high similarity may be recognized by using the current position information of the user. Here, it is assumed that the current position information includes all of the absolute position information, relative position information, travel direction, acceleration, and gaze direction of the user.

At this time, to further identify physical objects not identifiable from current position information, the augmented reality content management system 100 may determine an additional recognition region and distinguish the differences among physical objects by recognizing the additional recognition region.

Also, the augmented reality content management system 100 may determine a candidate position of the additional recognition region based on the current position information of each physical object.

In other words, referring to FIG. 14, if the user is located at the first position P1 and looks at a physical object in the front, the augmented reality content management system 100 determines a separation distance between the corresponding physical object and the user based on actual image information and detects the 3D coordinates (x1, y1, z1) of the physical object.

Since a plurality of additional recognition regions are already assigned to the physical object located at the 3D position (x1, y1, z1), the augmented reality content management system 100 may determine a candidate position of the additional recognition region based on the 3D coordinates (x1, y1, z1) of the physical object, namely based on the current position information of the physical object.

Since the augmented reality content management system 100 already knows which physical object already exists at the 3D coordinates (x1, y1, z1) and which part of the physical object has been designated as the additional recognition region, the augmented reality content management system 100 may identify an object simply by identifying the candidate position of the additional recognition region. This method provides an advantage that the amount of computations may be reduced for identifying additional recognition regions.

It should be noted that if an indoor environment is assumed and lighting directions are all the same, even physical objects with a considerable similarity may have shadows with different positions and sizes due to the lighting. Therefore, the augmented reality content management system 100 may identify the individual physical objects by using the differences among positions and sizes of shadows of the respective physical objects as additional information with reference to the current position of the user.

Meanwhile, the position of a virtual object of a 3D virtual image assigned to the corresponding physical object of actual image information is automatically adjusted so that a separation distance from the physical object is maintained and so displayed on the user terminal 200.

Also, positions of individual virtual objects are automatically adjusted so that a predetermined separation distance is maintained among the virtual objects and so displayed on the user terminal 200.

Therefore, since positions of objects are automatically adjusted by taking into account a relative position relationship between a physical and virtual objects so that the objects are not overlapped with each other, the user may check the information of a desired virtual object conveniently. In other words, a time period during which a user concentrates on the corresponding virtual object is lengthened, and thereby an advertisement effect may be increased.

Figure 15:
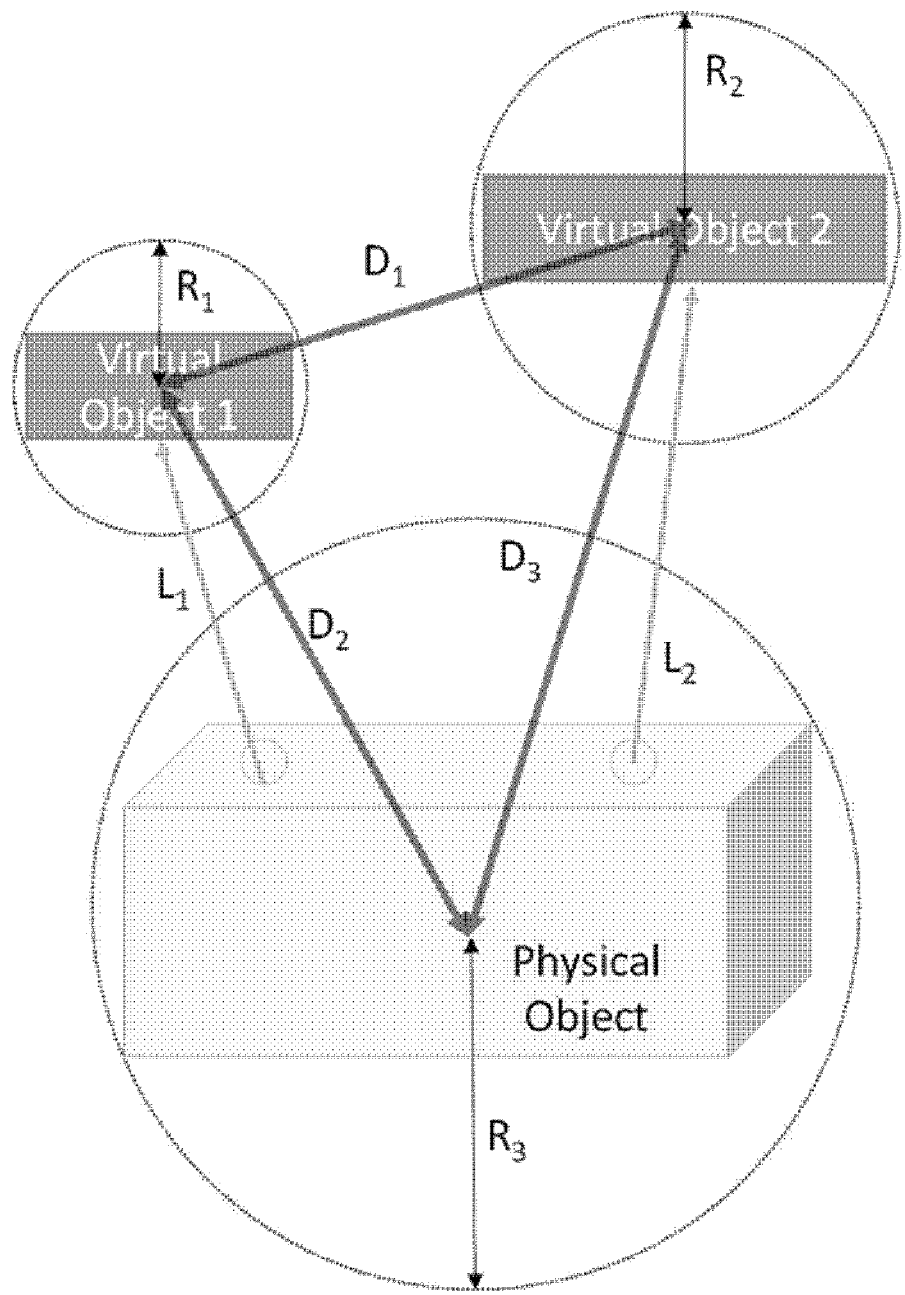
FIG. 15 illustrates another operating principle of the augmented reality operating system 1.

FIG. 15 illustrates another operating principle of the augmented reality operating system 1.

Referring to FIG. 15, the operating principles of the augmented reality system 1 will be described in more detail.

The separation distance D2 between a first virtual object (virtual object 1) and a physical object is automatically configured to be longer than a sum of the distance R1 between the center of the first virtual object (virtual object 1) and the outermost region of the first virtual object (virtual object 1) and the distance R3 between the center of the physical object and the outermost region of the physical object.

Also, the separation distance D3 between a second virtual object (virtual object 2) and a physical object is automatically configured to be longer than a sum of the distance R2 between the center of the second virtual object (virtual object 2) and the outermost region of the second virtual object (virtual object 2) and the distance R3 between the center of the physical object and the outermost region of the physical object.

Also, the separation distance D1 between the first virtual object (virtual object 1) and the second virtual object (virtual object 2) is automatically configured to be longer than a sum of the distance R1 between the center of the first virtual object (virtual object 1) and the outermost region of the first virtual object (virtual object 1) and the distance R2 between the center of the second virtual object (virtual object 2) and the outermost region of the second virtual object (virtual object 2).

The first virtual object (virtual object 1) and the second virtual object (virtual object 2) move in the horizontal and vertical directions and their positions in 3D space are automatically adjusted—with respect to the x, y, and z axis—so as to prevent the first and second virtual objects from being overlapped with other objects and disappearing from the field of view of the user.

Meanwhile, virtual lines L1, L2 are dynamically generated and displayed between the physical object and the first virtual object (virtual object 1) and between the physical object and the second virtual object (virtual object 2).

Virtual lines L1, L2 are displayed to indicate association with the physical object when a large number of virtual objects are present on the screen; and thickness, transparency, and color of the virtual lines L1, L2 may be changed automatically according to the gaze of the user.

For example, if the user gazes at the first virtual object (virtual object 1) longer than a predetermined time period, the augmented reality glasses 100 may operate to detect whether the first virtual object (virtual object 1) is gazed at and then to automatically change the thickness of the virtual line L1 between the physical object and the virtual object 1 (virtual object 1) to be thicker than that of the other virtual line L2, change the transparency to be lower, and change the color to another color that may be used to emphasize the virtual line, such as red color.

At this time, if it is assumed that both of the first virtual object (virtual object 1) and the second virtual object (virtual object 2) are allocated to the same physical object, the distance of a plurality of virtual objects assigned to the physical object is kept to a predetermined separation distance D2, D3, but the virtual object that has more specific information is disposed to be relatively closer to the physical object.

For example, suppose the information of the first virtual object (virtual object 1) is more specific, and the information of the second virtual object (virtual object 2) is relatively conceptual information.

Then the separation distance D3 between the second virtual object (virtual object 2) and the physical object is automatically set to be longer than the distance D2 between the first virtual object (virtual object 1) and the physical object, and thereby the user may quickly recognize the specific information.

Also, if a plurality of virtual objects are assigned to the physical object, two virtual objects may be automatically disposed to be closer as association with each other becomes high while the two virtual objects may be automatically disposed to be distant from each other as association with each other becomes low.

Figure 16A:
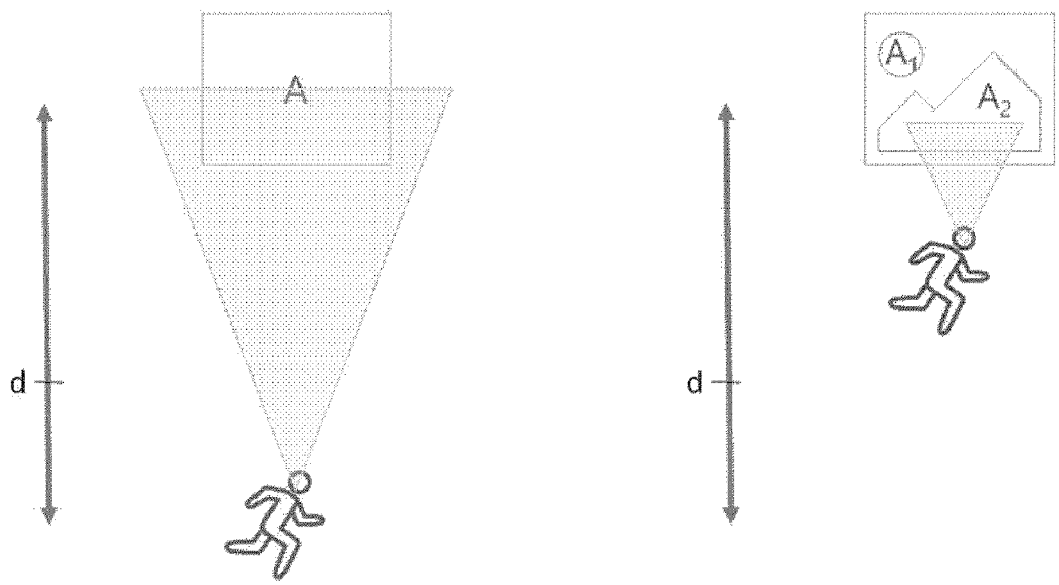
FIGS. 16a and 16b illustrate yet another operating principle of the augmented reality operating system 1.
Figure 16B:
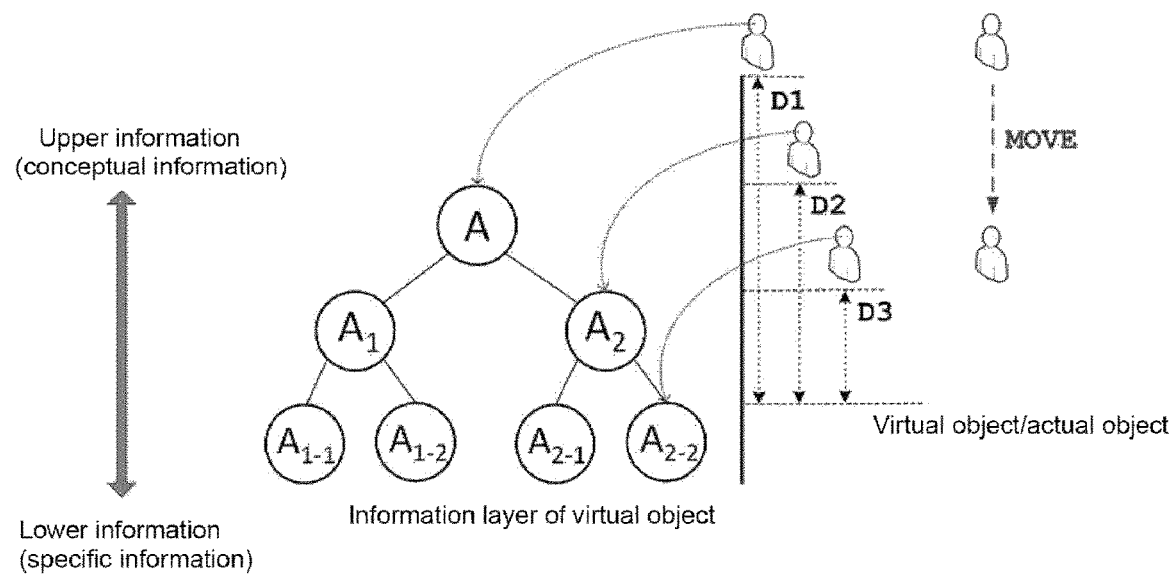

FIGS. 16a and 16b illustrate yet another operating principle of the augmented reality operating system 1.

Referring to FIGS. 16a and 16b, the amount of information of a virtual object in a 3D virtual image, displayed by being assigned to the corresponding physical object of actual image information may be automatically adjusted dynamically according to the distance between the physical object and the user and displayed on the user terminal 200.

Therefore, since the virtual object displays more specific information when the user approaches the physical object, the user may check information of a desired virtual object conveniently. In other words, a time period during which the user concentrates on the corresponding virtual object is lengthened, and thereby an advertisement effect may be increased.

In general, since a user tends to see information about an object of interest more closely, when the user is distant from the object of interest, information is displayed in an abstract manner while, when the user approaches an object of interest, more detailed information is made to be displayed.

A virtual object assigned to a physical object begins to be displayed from since the distance between the user and the physical object or virtual object reaches a predetermined separation distance D1; as the distance between the user and the physical object or virtual object becomes short, a virtual object having more specific information is displayed.

In other words, the information of a virtual object assigned to one physical object is organized in a layered structure. As shown in FIG. 11b, the most abstract virtual object A is displayed when the user enters a predetermined separation distance D1; when the user approaches D2 further toward the physical object or virtual object, a virtual object A1, A2 having more specific information is displayed. Also, if the user approaches D3 most closely toward the physical object or virtual object, a virtual object A1-1, A1-2, A2-1, A2-2 having the most specific information is displayed.

For example, suppose an automatic vending machine is disposed in front of the user as a physical object.

If the user approaches within a predetermined separation distance D1, a virtual object assigned to the automatic vending machine is displayed. Here, a virtual object is assumed to be expressed by an icon of the automatic vending machine.

Next, if the user further approaches D2 the automatic vending machine, icons of beverage products sold at the automatic vending machine are displayed as virtual objects with more specific information.

Lastly, if the user approaches D3 most closely to the automatic vending machine, calories, ingredients, and so on of the beverage products may be displayed as virtual objects with more specific information.

In another example, suppose a car dealership exists as a physical object in front of the user.

If the user approaches within a predetermined separation distance D1, a virtual object assigned to the car dealership is displayed. Here, the virtual object is assumed to be the icon of a car company.

Next, if the user further approaches D2 the car dealership, various types of car icons may be displayed as virtual objects providing more specific information. At this time, if a car is currently displayed, namely, in the presence of a physical object, a virtual object may be displayed in the vicinity of the physical object, and a virtual object may also be displayed in the vicinity of the user even if no car is currently displayed, namely, even in the absence of a physical object.

Finally, if the user approaches D3 the car dealership most closely, technical specifications, price, and estimated delivery date of a car being sold may be displayed as virtual objects of more specific information.

Meanwhile, if vibration occurs while the user is gazing at a virtual or physical object of interest, the user terminal 200 may calculate a movement distance according to the change rate of the vibration, reconfigure the amount of information of the virtual object based on the gaze direction and calculated movement distance, and displays the virtual object with the reconfigured information.

In other words, it may be assumed from vibration that the user has effectively moved without a physical movement, or a weight may be assigned to the movement distance through vibration, or the amount of information of a virtual object may be displayed after being reconfigured according to the virtual movement distance.

In other words, a large change rate of vibration indicates that the user is running or moving fast while a small change range of vibration indicates that the user is moving slowly; therefore, the movement distance may be calculated based on the change rate of vibration. Therefore, the user may apply vibration by moving his or her head up and down without actually moving around so as to reflect a virtual movement distance.

When vibration is continuously generated simultaneously while the user is gazing in the direction along which the user wants to check status, for example, while the user turns his head and gazes to the right, the user terminal 200 calculates the movement direction and movement distance based on the gaze direction of the user and the vibration.

In other words, the user terminal 200 detects rotation of the user's head through an embedded sensor and calculates the virtual current position after vibration is detected, where the movement distance due to walking or running is figured out through the change rate of the vibration.

When the user's gaze direction is detected, the user terminal 200 may be configured to detect the gaze direction based on the rotational direction of the head or configured to detect the gaze direction by detecting the movement direction of the eyes of the user.

Also, the gaze direction may be calculated more accurately by detecting the rotational direction of the head and the movement direction of the eyes simultaneously but assigning different weights to the two detection results. In other words, the gaze direction may be configured to be calculated by assigning a weight of 50% to 100% to the rotation angle detection due to rotation of the head and assigning a weight of 0% to 60% to the rotation angle detection due to the movement direction of the eyes.

Also, the user may configure the user terminal 200 to select and perform a movement distance extension configuration mode so that a distance weight 2 to 100 times the calculated virtual moved distance may be applied.

Also, in calculating a virtual movement distance corresponding to the change rate of vibration, to exclude a noise value, the user terminal 200 may calculate a virtual movement distance based on the change rate of the vibration value except for the upper 10% and the lower 20% of the vibration magnitude.

As a result, even if the user does not actually approach a physical or virtual object or the user approaches the object very slightly, the user may still check the virtual object with the same amount of information as when the user approaches the physical or virtual object right in front thereof.

Also, the augmented reality operating system 1 is equipped with a Wi-Fi communication module and may further comprise a plurality of sensing units (not shown in the figure) disposed at regular intervals in the indoor environment.

A plurality of sensing units may be disposed selectively so as to detect the position of the user terminal 200 in the indoor environment.

Each time a Wi-Fi hotspot signal periodically output from the user terminal 200 is detected, a plurality of sensing units 300 may transmit the detected information to the augmented reality content management system 100, and then the augmented reality content management system 100 may determine a relative position of the user terminal 200 with reference to the absolute position of the plurality of sensing units.

As described above, the proposed system obtains the current position information based on the satellite position information in the outdoor environment while obtaining the current position information by using Wi-Fi signals in the indoor environment.

Meanwhile, an additional method for obtaining current position information in the indoor and outdoor environments may be described as follows.

A method for obtaining current position information from Wi-Fi signals may be largely divided into triangulation and fingerprinting methods.

First, triangulation measures Received Signal Strengths (RSSs) from three or more Access Points (APs), converts the RSS measurements into distances, and calculates the position through a positioning equation.

Next, fingerprinting partitions an indoor space into small cells, collects a signal strength value directly from each cell, and constructs a database of signal strengths to form a radio map, after which a signal strength value received from the user's position is compared with the database to return the cell that exhibits the most similar signal pattern as the user's position.

Next, a method for collecting position data of individual smartphones by exchanging Wi-Fi signals directly and indirectly with a plurality of nearby smartphone users.

Also, since the communication module of the user terminal 200 includes a Bluetooth communication module, current position information may be determined by using Bluetooth communication.

Also, according to another method, a plurality of beacons are first disposed in the indoor environment, and when communication is performed with one of the beacons, the user's position is estimated to be in the vicinity of the beacon.

Next, according to yet another method, a receiver having a plurality of directional antennas arranged on the surface of a hemisphere is disposed in the indoor environment, and the user's position is estimated through identification of a specific directional antenna that receives a signal transmitted by the user terminal 200. At this time, when two or more receivers are disposed, a 3D position of the user may also be identified.

Also, according to still another method, current position information of the user is normally determined based on the satellite position information, and when the user terminal 200 enters a satellite-denied area, speed and travel direction of the user are estimated by using the information of 9-axis sensor. At this time, the user's position in the indoor environment may be estimated through step counting, stride length estimation, and heading estimation. At this time, to improve accuracy of estimation, information of the user's physical condition (such as height, weight, and stride) may be received for position estimation computations. When the information of the 9-axis sensor is used, accuracy of estimation information may be improved by fusing the dead-reckoning result of the 9-axis sensor and the position estimation technique based on the Wi-Fi communication.

In other words, a global absolute position is computed even though the position accuracy based on the Wi-Fi technique may be somewhat low, and then a relative position with a locally high accuracy obtained through the information of the 9-axis sensor is combined with the global absolute position to improve the overall position accuracy. Also, by additionally applying the Bluetooth communication, accuracy of position estimation may be further improved.

Also, according to yet still another method, since a unique magnetic field is formed for positioning in the indoor environment, a magnetic field map of each space is constructed, and the current position is estimated in a similar manner as the Wi-Fi based fingerprinting technique. At this time, a change pattern of the magnetic field generated as the user moves in the indoor environment may also be used as additional information.

Also, according to a further method, lights installed in the indoor environment may be used. In other words, while LED lights are blinked at a speed at which a human is unable to discern their on and off switching, a specific position identifier is outputted from the LED light, and the camera of the user terminal 200 recognizes the specific position identifier for position estimation.

Also, according to a still further method, images taken at various positions of the indoor environment and from various viewpoints are stored in the form of a database, and then a photograph taken at the user's current position is matched against the database, where the position is refined as various landmarks (such as a signboard, trademark, room number, or cover plate) of the indoor environment are additionally identified.

It should be noted that at least one or more indoor positioning methods have to be combined to yield the most accurate position estimate.

An augmented reality operating system according to an embodiment of the present invention may create and distribute augmented reality content easily and quickly in the form of an URL address by utilizing augmented reality Software as a Service (SaaS).

Non-programmers (non-experts) may easily leverage functions for creating, managing, and analyzing augmented reality content via the web, and billing may be performed individually for required functions such as authoring function, exposure period, number of registrations/inquiries, capacity, and group authority setting.

Therefore, users may concentrate on creation of content itself and create/distribute augmented reality content at a very low cost compared with an installation-based application that requires a high cost for creation and management. In other words, since augmented reality content created through a web-based augmented reality content management system is distributed via a URL address, it may be easily shared via Internet news, blogs, and SNS; moreover, since content may be experienced via a web browser without installing a separate application, accessibility to the content is very high.

As described above, it is apparent for those skilled in the art that the present invention may be embodied in other specific forms without changing the technical principles or essential characteristics of the present invention. Therefore, the embodiments described above should be regarded as being illustrative rather than restrictive in every aspect. The technical scope of the present invention should be determined by the appended claims given below rather than the detailed descriptions above, and it should be understood that the implications and scope of the appended claims and all of the modifications or modified forms that are derived from an equivalent concept of the present invention belong to the technical scope of the present invention.

What is claimed is:

1. An augmented reality operating system comprising:
   a manager terminal accessing augmented reality software as a service of an augmented reality content management system via an installed web browser and creating augmented reality content by determining an augmentation position on a map, a physical object of actual image information located at the augmentation position, and a virtual object assigned to the physical object respectively; and
   in supporting creation of the augmented reality content based on the augmented reality software as a service, the augmented reality content management system providing a template for creating the augmented reality content on the web browser authorized as a manager and billing a payment according to the type of template used, wherein
   in learning a plurality of images in the form of tree-type data structure suitable for extraction and matching of image features and performing real-time recognition and detection of input images based on the learning result, the augmented reality content management system supports search tree generation for large-scale image learning through dynamic generation of Bag-of-visual Words (BoW) based hierarchical tree-type data structure.

2. The system of claim 1, wherein the augmented reality content management system provides current position information transmitted from the manager terminal and a 3D virtual image corresponding to the actual image information to the manager terminal in real-time; and identifies a physical object of the actual image information and updates a virtual object of the 3D image information, assigned to the identified physical object, in real-time according to the control of the manager terminal.

3. An augmented reality operating system comprising:
   an augmented reality management system providing a pre-assigned 3D virtual image to a web browser which has transmitted a URL address in a distribution mode and in supporting creation of augmented reality content based on augmented reality software as a service in an authoring mode, providing a template for creating the augmented reality content on a web browser authorized as a manager and billing a payment according to the type of template used;
   a user terminal receiving the 3D virtual image from the augmented reality content management system by transmitting the URL address through an installed web browser and displaying each physical object of actual image information displayed on the web browser by augmenting the physical object with a pre-assigned virtual object of the 3D virtual image in a distribution mode; and
   a manager terminal accessing augmented reality software as a service of the augmented reality content management system via an installed web browser, creating the augmented reality content by determining an augmentation position on a map, a physical object of actual image information located at the augmentation position, and a virtual object assigned to the physical object respectively in an authoring mode, wherein
   in learning a plurality of images in the form of tree-type data structure suitable for extraction and matching of image features and performing real-time recognition and detection of input images based on the learning result, the augmented reality content management system supports search tree generation for large-scale image learning through dynamic generation of Bag-of-visual Words (BoW) based hierarchical tree-type data structure.

4. The system of claim 3, wherein the augmented reality content management system provides current position information transmitted from the user terminal and the 3D virtual image corresponding to actual image information to the user terminal in real-time, identifies a physical object of the actual image information and provides a virtual object of the 3D virtual image, assigned to the identified physical object, to the user terminal in the distribution mode; and
   provides current position information transmitted from the manager terminal and a 3D virtual image corresponding to the actual image information to the manager terminal in real-time, identifies a physical object of the actual image information and updates a virtual object of the 3D image information, assigned to the identified physical object, in real-time according to the control of the manager terminal in the authoring mode.

* * * * *